US 6,574,375 B1

(12) United States Patent
Cullen et al.

(10) Patent No.: US 6,574,375 B1
(45) Date of Patent: Jun. 3, 2003

(54) METHOD FOR DETECTING INVERTED TEXT IMAGES ON A DIGITAL SCANNING DEVICE

(75) Inventors: John F. Cullen, Mountain View, CA (US); David G. Stork, Stanford, CA (US); Peter Hart, Menlo Park, CA (US); Koichi Ejiri, Chiba-Ken (JP)

(73) Assignees: Ricoh Company, Ltd., Tokyo (JP); Ricoh Corporation, Menlo Park, CA (US)

(*) Notice: Subject to any disclaimer, the term of this patent is extended or adjusted under 35 U.S.C. 154(b) by 0 days.

(21) Appl. No.: 08/614,913

(22) Filed: Mar. 12, 1996

Related U.S. Application Data

(63) Continuation of application No. 08/293,255, filed on Aug. 19, 1994, now abandoned, which is a continuation of application No. 08/028,504, filed on Mar. 9, 1993, which is a continuation-in-part of application No. 07/864,423, filed on Apr. 6, 1992, now Pat. No. 5,335,290.

(51) Int. Cl.[7] .................................................. G06K 9/32
(52) U.S. Cl. ........................................ 382/290; 382/288
(58) Field of Search ................................ 382/290, 173, 382/177, 286, 288, 291, 292, 289

(56) References Cited

U.S. PATENT DOCUMENTS

| 4,595,958 | A | | 6/1986 | Anderson, Jr. et al. ...... 358/296 |
| 4,866,784 | A | * | 9/1989 | Barski ............................ 382/46 |
| 4,941,189 | A | * | 7/1990 | Britt .............................. 382/46 |
| 5,070,465 | A | | 12/1991 | Kato et al. .................... 395/141 |
| 5,120,940 | A | * | 6/1992 | Willsie .......................... 382/48 |
| 5,185,813 | A | | 2/1993 | Tsujimoto ....................... 382/9 |
| 5,218,460 | A | | 6/1993 | Nakajima ..................... 358/456 |
| 5,305,397 | A | * | 4/1994 | Yamaguchi et al. .......... 382/46 |
| 5,471,549 | A | * | 11/1995 | Kurosu et al. ............... 382/290 |

OTHER PUBLICATIONS

Wahl et al., "Block Segmentation and Text Extraction in Mixed Test/Image Documents," *Computer Graphics and Image Processing* 20:375–390 (1982).

* cited by examiner

*Primary Examiner*—Yon Couso
(74) *Attorney, Agent, or Firm*—Townsend and Townsend and Crew, LLP

(57) ABSTRACT

A method and apparatus for detecting proper page orientation of a scanned document image. The document is subdivided into a series of word boxes. The number of ascending and descending text characters within the word can then be compared with the number expected for a properly oriented document to verify page orientation.

18 Claims, 11 Drawing Sheets

METHOD FOR DETECTING INVERTED TEXT IMAGES ON A DIGITAL SCANNING DEVICE

This is a continuation Ser. No. 08/293,255, filed Aug. 19, 1994, now abandoned, which is a continuation Ser. No. 08/028,504, filed Mar. 9, 1993, now abandoned, which is a continuation-in-part of application Ser. No. 07/864,423 titled "Segmentation of Text, Picture and Lines of a Document Image" filed Apr. 6, 1992 now U.S. Pat. No. 5,335,290.

BACKGROUND OF THE INVENTION

The present invention relates to reproduction of images and in particular to digital scanning and character recognition systems.

A document image is a visual representation of a two-dimensional printed page. A document image can be created by optical scanning or raster-digitizing the document object. Common devices used to create document images include photocopiers, facsimile machines and digital scanners. These document imaging devices are of great assistance in today's business world for the efficient assembly and dissemination of printed information.

In documents having multiple pages or images, however, there exists a probability that an individual page, or image, may be in an improper orientation relative to the remaining images and text within the document. For example, one page of a multiple page document may be upside down when compared to the remainder of the document. This occurrence inconveniences the reader of the assembled document. In addition, the inclusion of an improperly oriented image may be negatively interpreted as the sloppiness and unprofessionalism of the document producer.

At present, the predominant way to detect an image in an improper orientation is by visual inspection of the document prior to assembly or reproduction. This process is labor intensive and inefficient. Furthermore, this process is also subject to human error, or the limitations of the inspector to recognize the proper orientation. For example, the document may be in a foreign language other than that known to the inspector. For this reason, the inspector may have difficulty detecting a page in an improper orientation.

SUMMARY OF THE INVENTION

The present invention provides an apparatus and method for detecting incorrect orientation of pages or text within a document during document assembly storage and/or reproduction. The improperly oriented image can then be reproduced in the correct orientation within the completed document by digital manipulation of the image.

According to one aspect of the present invention, the image to be reproduced is first scanned to form a digital representation of the document. The document is then analyzed at the pixel level to identify rectangles that bound text words, noise and image data. In a selection of rectangles, identified as containing words, the number of black pixels on each scan line within the rectangle are counted. The pixel count can be used to determine the number of ascenders and descenders within the rectangle and this data can be analyzed to determine the proper orientation of the document. For example, within the English language, words are comprised primarily of ascenders. The mean, variance and/or skew for a sample set of the document pixel data can be compared to normalized mean, variance and/or skew data for documents in a known orientation to ascertain the orientation of the current document image.

According to another aspect of the present invention, the classification of the document image into word, image and noise data permits the document orientation to be ascertained easily despite the presence of image data.

DESCRIPTION OF THE PREFERRED EMBODIMENT

Method Overview

Figure 1:
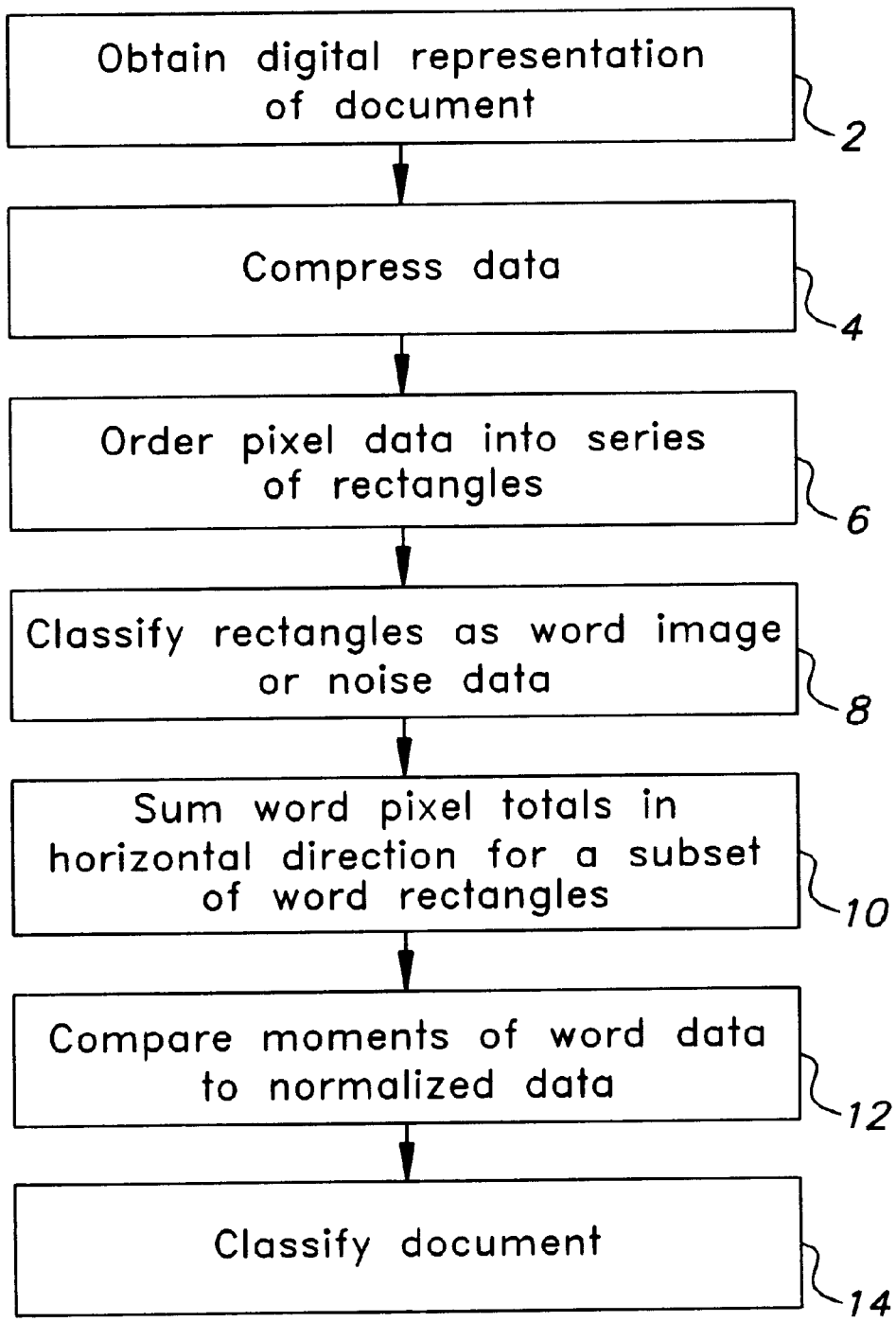
FIG. 1. is a diagram of data flow according to an embodiment of the present invention.

FIG. 1 shows a summary of the process for detecting an inverted page according to an embodiment of the present invention. The first step 2 creates a digital representation of the physical document as rows of bits. A document scanner may be used for this purpose. Each bit corresponds to a single picture element, or pixel, of the scanned image and represents the presence or absence of white space at that location. To minimize the total amount of system memory required, the image pixel data obtained in step 2 is compressed in step 4.

In most documents, a region of white space separates words and images from one another in both the vertical and horizontal directions. A word, text, or picture image thus may be viewed as a run of predominately black pixels separated by an expanse of white pixels. The boundaries of these two regions define the edges of a rectangle containing a word or image therein. Step 6 performs the operations necessary to reclassify the document image pixel data using the relationship described above.

Text, noise and image rectangles also possess characterizing features. For example, word rectangles tend to have smaller dimensions and smaller aspect ratios than picture image rectangles. Step 8 uses these relationships to identify text blocks from the entire set of document rectangles.

Rectangles classified as text are then further processed in step 10 of FIG. 1 to form a word histogram. The histogram represents the number of black pixels on each horizontal scan line of the word rectangle.

Word histograms indicate whether the text characters for a given word are predominately ascenders or descenders. In the English language, the majority of text characters are ascenders. For example, capitol letters, and the letters "h" and "t" are ascenders. This fact can be used to analyze the correct position of the document in steps 12 and 14.

Step 12 obtains the mean, variance and skewness of the histogram data taken from a sample set of forty document rectangles. The mean, variance and skewness values of the sample data set are then compared to known normalized data curve for documents of the same language having a known orientation. Step 14 classifies the subject document as inverted or not according to the relationship of the sample data to the normalized data.

Hardware Overview

Figure 2:
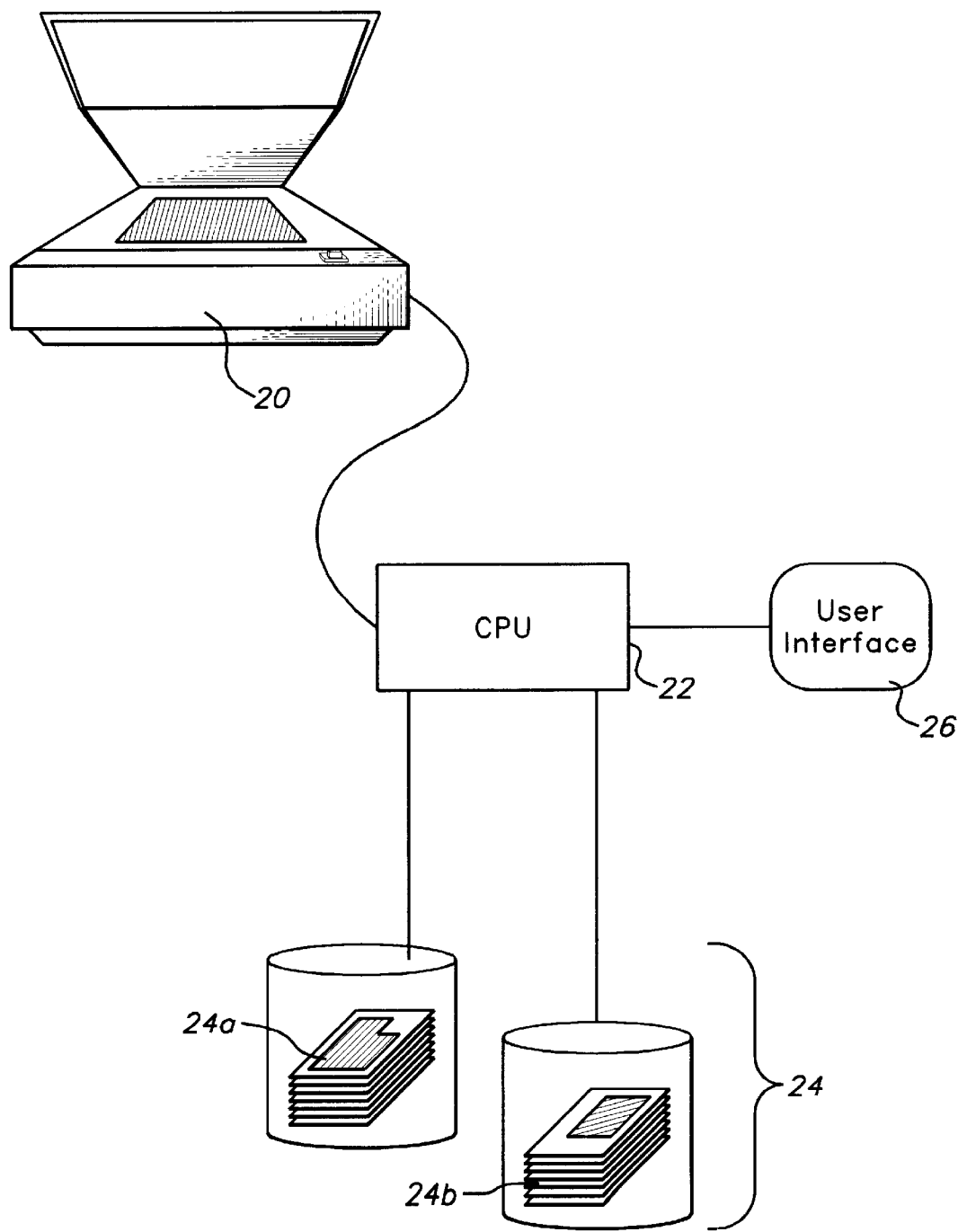
FIG. 2 is a block diagram of a system useful for implementing an embodiment of the invention.

FIG. 2 depicts a hardware configuration suitable for performing image reproduction and orientation detection according to a preferred embodiment of the invention. The hardware configuration may be included in a stand alone device such as a photo-copier, or be part of a local or wide area network. The document imaging system comprises a scanning device 20 which may be a charge coupled device, (CCD) coupled to a CPU 22. Other scanning devices known to those of skill in the art may also be used. CPU 22 executes commands to process the document image data according to the present invention.

CPU 22 is coupled to a memory 24 which may be any form of random access memory. Memory 24 stores the document image data and may include separate memories 24a and 24b for storing text and picture image data respectively. A read only memory (not shown) may also be coupled to CPU 22 for storage of commands and data executed by CPU 22.

Also coupled to CPU 22 is a user interface 26. User interface permits the document imaging equipment operator to specify the features desired for the completed document and thus directs CPU 22 to execute a subset of commands necessary to implement these features. For example, the equipment operator may specify that so many collated copies are to be made, or that the completed document is to be routed to a specific destination.

DETAILED DESCRIPTION OF METHOD AND OPERATION

Figure 3A:
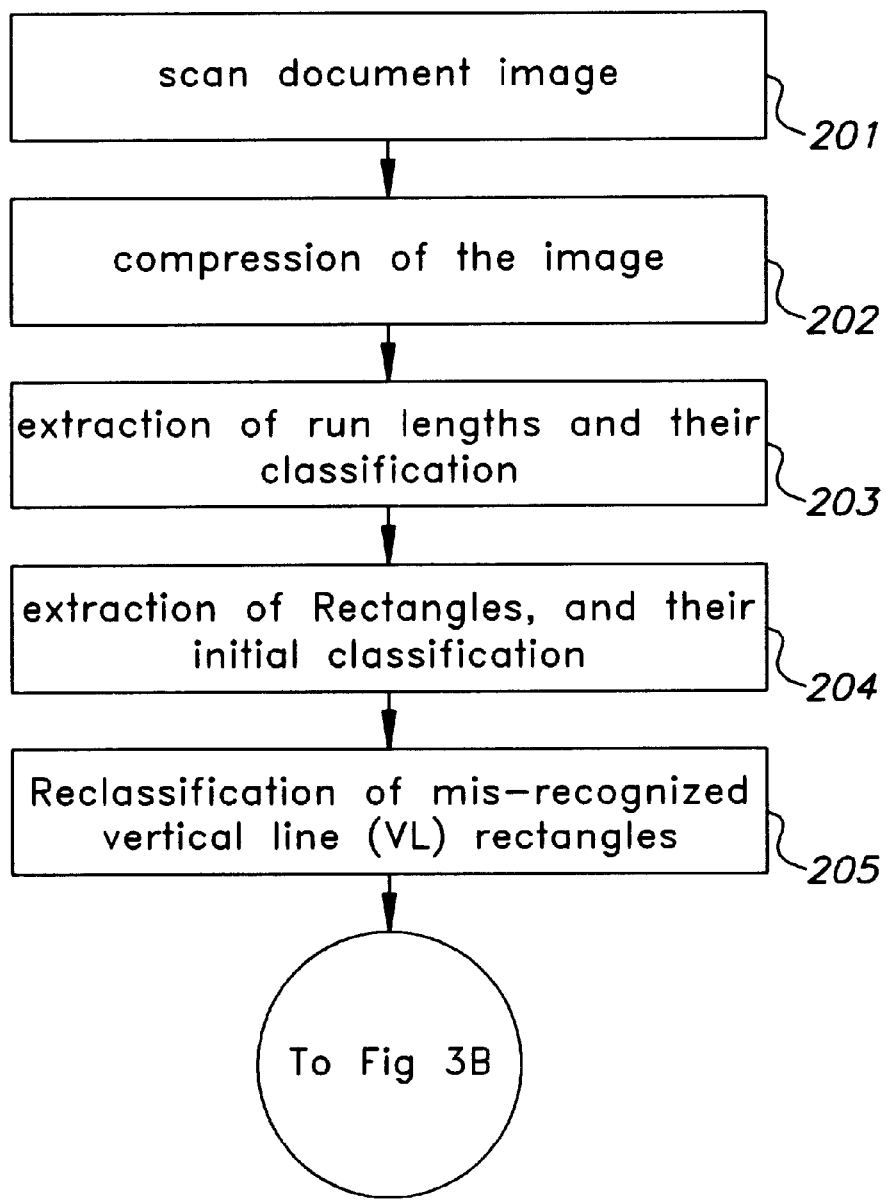
FIG. 3A is a flow chart of a method of detecting inverted images according to an embodiment of the present invention.
Figure 3B:
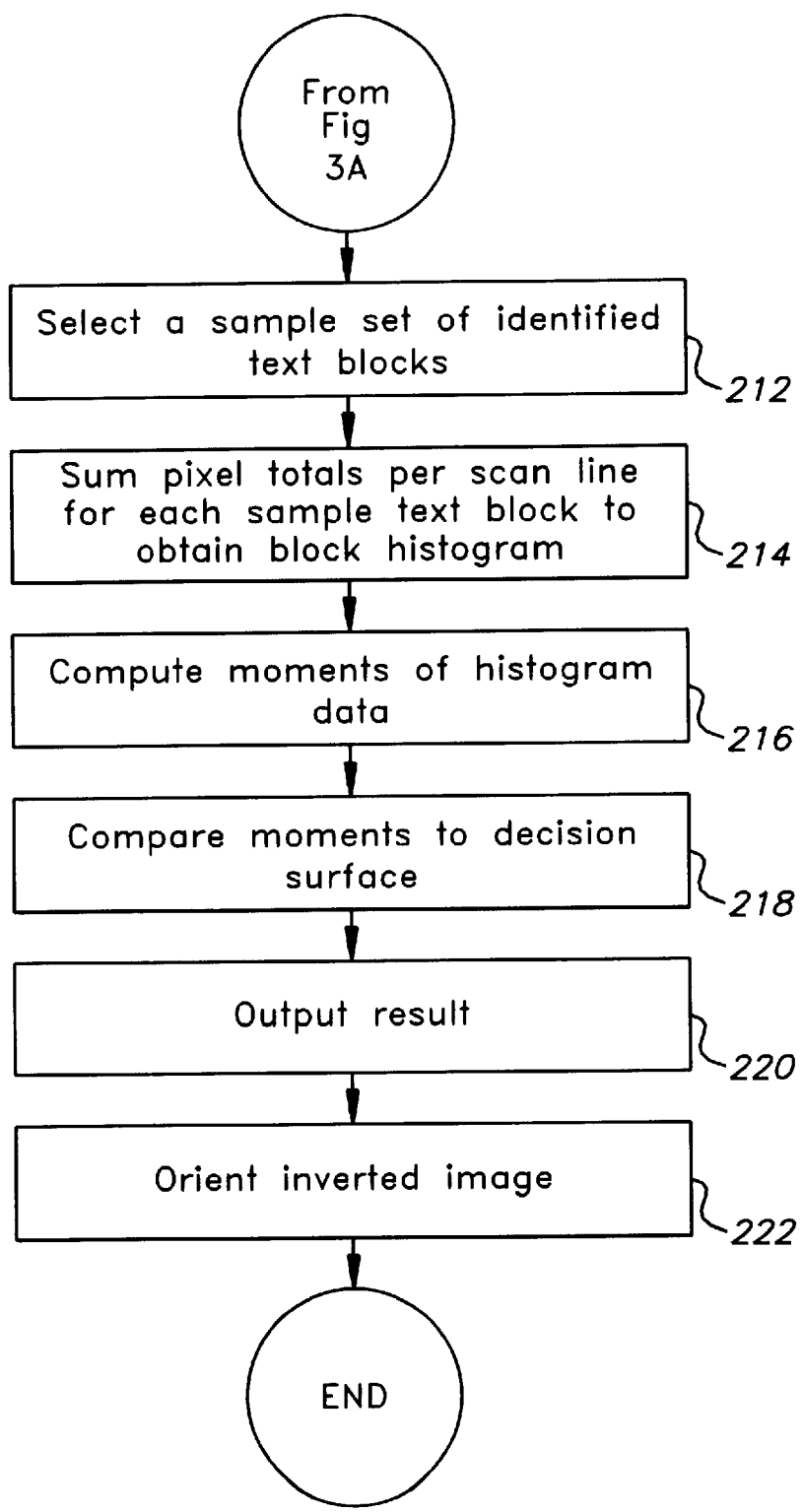
FIG. 3B is a continuation of the flow chart of FIG. 3A.

FIGS. 3A–3B contain a flow chart of a method for image orientation detection according to the present invention. In the flow of FIG. 3A, a CCD scanner or other scanning device first scans the document in step 201 to create a digital representation of the document image. Each scan line results in a row of bits that correspond to pixels of the image. In a preferred embodiment, scan lines extend from left to right. The scan direction may, however, be reoriented to correspond to the direction in which the scanned document is normally read. An arabic text, for example, may be scanned from right to left.

Compression of the bit-mapped representation occurs in step 202. Data compression is used for the extraction of rectangles as discussed below. The compression technique of the implemented embodiment causes a 4 to 1 reduction in the actual amount of data used to represent the document and a 32 to 1 reduction in the amount of processed data. The compression technique combines four (4) horizontal scanlines into one compressed scanline, using a logical bit-wise OR operator. The number of scanlines chosen to be compressed, i.e. 4, is based on experimentation. The choice of 4 scanlines enables processing of documents having as low as 6 point typeface. Other numbers are possible.

The compression technique of step 202 has two components; vertical compression and horizontal compression. If there exists one or more black pixels at the same location within the four vertically adjacent scan lines, then the single line resultant pixel is represented as a black pixel. If no black pixels exist at the same location within the group of four scan lines, the resultant pixel is labeled a white pixel.

Figure 4:
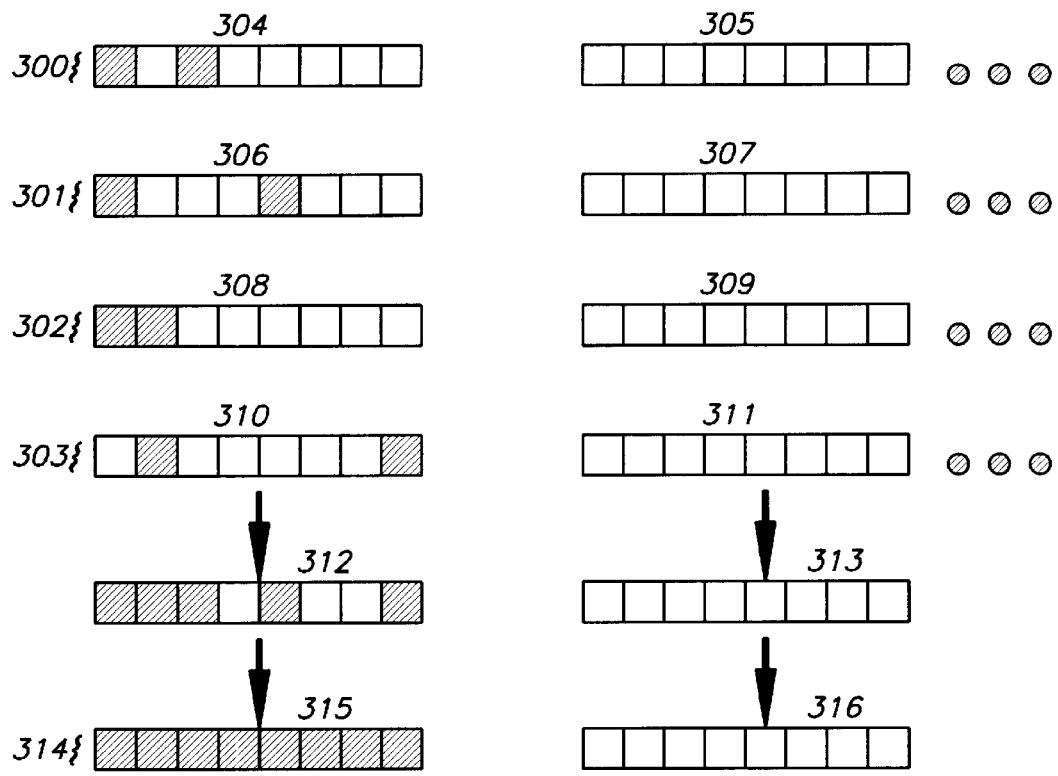
FIG. 4 is an illustration of an image data compression technique according to an embodiment of the present invention.

FIG. 4 illustrates scanline compression in the implemented embodiment. Illustrated in FIG. 4 are four scanlines 300–303, respectively, from the original, uncompressed bit-mapped representation. For each of the scanlines 300–303, two bytes are represented, 304–311, respectively. Also illustrated are resultant bytes 312–313 of vertical compression. Each of the bytes 304–311 and resultant bytes 312–313, is comprised of 8 bits.

Horizontal compression of the image data occurs after vertical compression of the image data. If a segment 312–313 contains black pixel data, the segment is represented as a single black byte of pixel data as shown on line 314 of FIG. 4. If a segment contains no black pixel data, that segment is represented as a single byte of white pixel data. The compression technique described above reduces system memory requirements. Compression techniques other than that described herein may also be used with the present invention. Optionally, compression of the data may be omitted.

After compression of the image in step 202 of FIG. 3A, analysis of the document image data orders the data into rectangles in steps 203–204. Rectangles define the boundaries of text, picture images, and noise. To obtain the rectangle data, step 203, first describes the run length for each block of contiguous black pixels by a process called run length extraction.

In defining a run length, a first element specifies the location of the black pixel where the transition from white to black occurs, and a second element specifies where the transition from black to white, occurs. Each compressed scanline may have one or more-run lengths. For each compressed scanline, a run length set, comprised of run length records is created by searching along a compressed scanline for sequences of contiguous black pixels. Sequences of contiguous black pixels are identified by examining the byte values in the scanline for non-zero logical values where a zero logical value represents a white pixel. The first pixel location of such a sequence is set as the start value for the run length. The next white pixel is then sought by examining the successive byte values in the scanline for a logical zero value. This pixel is set as the end value for the run length. In this manner all the run lengths for a scanline are extracted. Once all the run lengths for the scanline are extracted, the set is labeled as the set of run lengths existing at the nth scanline from the top of the compressed bit mapped representation.

Classification of the run length is used to make an initial classification of associated extracted rectangles. The classification rules for a 300 dots per inch scanned document, based on heuristic data are as follows:

1. Assign SHORT run length type if less than or equal to 2 pixels.
2. Assign LONG run length type if greater than 60 pixels.
3. Assign MEDIUM run length type if run length is greater than 2 pixels and less than or equal to 60 pixels.

Figure 5:
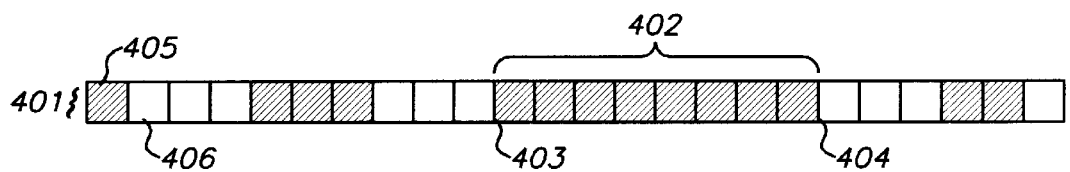
FIG. 5 is an example of run lengths according to an embodiment of the present invention.

FIG. 5 illustrates a scanline of pixels and a run length. FIG. 5 is simplified in that a byte has been reduced to its corresponding pixel value. For example, the pixel 405 represents a non-zero byte value (i.e. a black pixel) while a pixel 406 represents a zero bytes value (i.e. a white pixel). A scanline 401 has a portion 402 comprised of a series of contiguous black pixels. The address of a pixel 403 designates the start of the run length, while the address of a pixel 404 designates the end of the run length. Assuming that the pixel 403 is at address 312 and the pixel 404 is at address 440 and that the threshold for a long run length is 100, the resulting run length record would have starting position value 312, an ending position value 440 and the run length flag value for a long run length.

As the run lengths are extracted on the compressed scanlines, rectangles describing the features of the document are being constructed. These rectangles describe the bounds of contiguous black pixels in both the horizontal and the vertical directions in the document image. Run lengths are one dimensional, whereas rectangles are two dimensional.

At any point in the processing, only two sets of records describing the run lengths of two compressed scanlines are utilized and stored in memory. A first set of records describe the current scanline run lengths, and a second set describes the previous scanline run lengths. The previous scanline information is used for rectangle extraction. Prior to reading a new set of compressed scanline records, the old current set of records is copied to the memory location for holding the records of the previous scanline. The records describing the new scanline are then read into the memory location for holding the records describing the current scanline and is processed accordingly.

Relationships between the current compressed scanline and the previous compressed scanline determine whether the current compressed scanline run lengths get assigned to existing rectangles, or if a new rectangle is created. When the first compressed scanline is processed, each run length defines a rectangle. As each new current compressed scanline gets processed, run lengths are associated with a rectangle in the preexisting line or are used to define the boundaries of a new rectangle. A run length is associated with a preexisting rectangle if any portion of the run length exists within the boundary of the rectangle. A rectangle is complete and no longer gets expanded when all of the pixels of the current compressed scanline that are adjacent to the rectangle are white. In other words, a rectangle terminates when no run lengths of the current compressed scanline lie within the rectangle boundary. A new rectangle is created when a run length is not completely within the boundary of a rectangle. Such a scheme allows for the creation of rectangles which overlap. Overlapped rectangles are further processed in subsequent steps.

Figure 6:
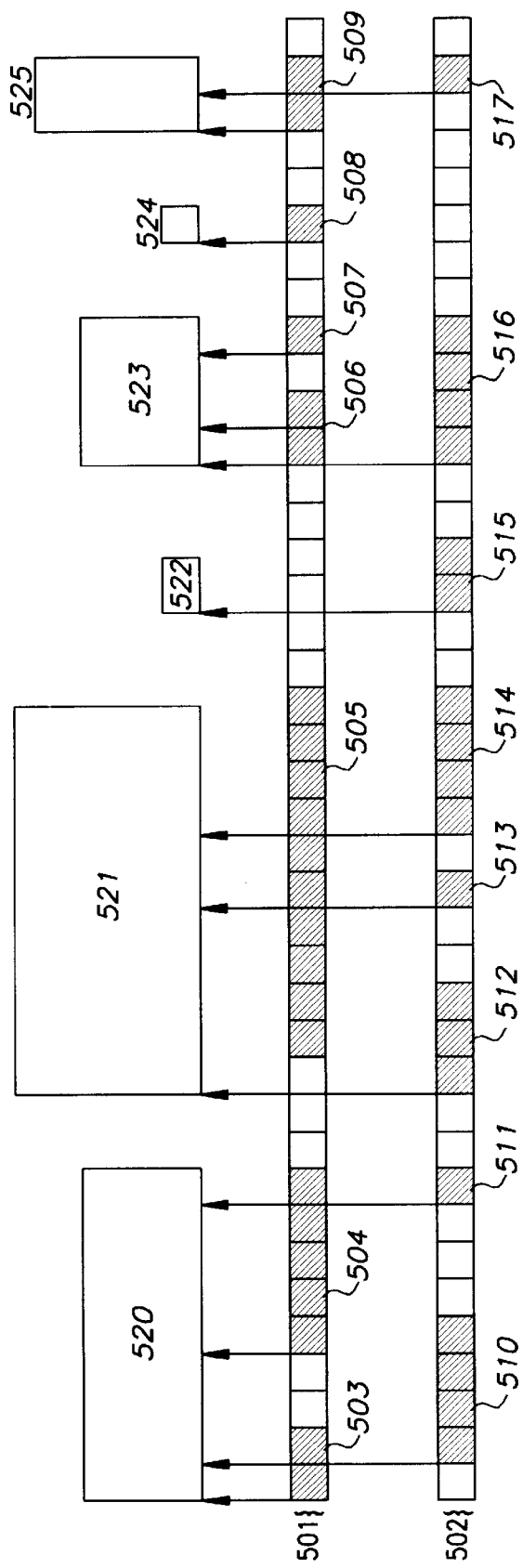
FIG. 6 is an illustration of the reduction of run length data to rectangle data according to the present invention.

Construction of a rectangle from run lengths is illustrated in FIG. 6. In FIG. 6, a previous compressed scanline 501 and a current compressed scanline 502 each contain a plurality of run lengths. The previous compressed scanline 501 has run lengths 503–509 while the current compressed scanline 502 has run lengths 510–517. As illustrated, scanlines 501 and 502 are bit-wise aligned. Thus, the left most bit in the scanline 501 corresponds to the left most bit in scanline 502.

FIG. 6 also shows previously defined rectangles 520–525. The relationship that must exist for a run length 503–509 and 510–517 to be added to an existing rectangle is that the starting point for a run length in the current scanline must have continuity with a run length in the previous scanline. For example, in FIG. 6, the starting point for run length 510 has continuity with run lengths 503 and 504 of compressed scanline 501. With respect to run length 515, no continuity exists with a run length in the previous scanline 501. Thus, the new rectangle 522 is created. For run length 508 in the previous scanline 501, there is no continuity to a run length in the current scanline, thus the rectangle 524 is completed.

In FIG. 6, the run lengths of scanline 501 add to existing rectangles as follows: run lengths 503–504 add to rectangle 520, run length 505 adds to rectangle 521, run lengths 506–507 add to rectangle 523 and run length 509 adds to rectangle 525. Run length 508 causes the creation of rectangle 524. With respect to scanline 502, run lengths 510–511 add to rectangle 520, run lengths 512–514 add to rectangle 521, the run length 516 adds to rectangle 523 and run length 517 adds to rectangle 525. Run length 515 causes the creation of rectangle 522.

As rectangles are being constructed, a count is kept of the different types of run lengths that comprise each rectangle. When a completed rectangle has been defined initial rectangle classification is performed. Rectangles are classified into one of four types: vertical line (VL), horizontal line (HL), picture image (IMG), or unknown (UNKNOWN). The following general rules, again scaled to document resolution, are used to make the classification:

1. IF (Run lengths are all of Type Long) AND (Rectangle Height is less than or equal to the Runlength. Type Short threshold) THEN classify rectangle as type HL.
2. IF (Run lengths are all of Type Short) AND (Rectangle Height is greater than the Runlength Type Short threshold) THEN classify rectangle as type VL.
3. IF ((Run lengths are Type Long) OR (Rectangle width is less than or equal to the Runlength type Long Threshold)) AND (Rectangle height is greater than Image height and rectangle threshold) THEN classify rectangle as type IMG.
4. Classify all remaining rectangles as UNKNOWN.

Note that rule 1 identifies horizontal lines, rule 2 identifies vertical lines, rule 3 identifies image rectangles and rule 4 provides a default unknown classification. For a 300 dot per inch document image, the threshold values Runlength Type Short threshold has been determined to be 2 pixels while the Image Height Rectangle Threshold has been determined to be 82 pixels. The above classification rules are constructed from known parameters of what a typical document should contain. These parameters may be modified depending on the resolution of the bit-mapped representation of the document, and/or may be tuned to a specific document by analyzing the rectangle size distribution.

At the end of step 204 of FIG. 3A, a list of rectangles describing all the basic objects in the document image will have been created and initially classified. Some text may be misclassified at this stage as vertical line or unknown segments. For example, the characters "I", "P" and "1" are frequently misclassified.

Therefore, in step 205 the following rules test and refine the initial classification made:

Rule 1: corrects for misclassified text, namely, 1, l or I that were classified as vertical lines IF (rectangle type is VL) AND (rectangle height is less than threshold height for unknown rectangles) THEN (classify rectangle as type UNKNOWN)

Rule 2: re-assigns rectangles based on font size. If greater than maximum font size, they must be pictures. IF(rectangle height, scaled by a factor of; 2) is greater than (threshold for picture height) THEN (classify rectangle as type IMG)

Rule 3: assigns image areas based on the premise that words tend to be longer than they are high. IF ((rectangle height scaled by factor of 4) added to (rectangle width)) is greater than (threshold for picture height scaled by a factor of 4) THEN (classify rectangle as type IMG)

Rule 4: describes the criteria for defining a horizontal line based on the premise that loner horizontal lines tend to be thicker than short horizontal lines that divide text blocks or columns. IF ((rectangle width) as a ratio (rectangle height scaled by a factor of 4)) is greater than (threshold for width of horizontal line) THEN (classify rectangle as type HL)

Rule 5: describes the criteria for differentiating a horizontal line from a long line of small (e.g. 6 point) font text. IF ((rectangle width) as a ratio of (rectangle height)) is greater than (threshold for horizontal line width height ratio) THEN (classify rectangle as type HL)

For a 300 dot per inch image, the values for the various thresholds are: Threshold height for unknown rectangles is 5, threshold picture height is 82, threshold width of a horizonal line is 77 and threshold for horizontal line width height ratio is 15.

At the conclusion of step 205 an accurate classification of image picture areas, vertical lines and horizontal lines exists. The remaining UNKNOWN rectangles predominantly contain text.

Once the text blocks comprising the document image have been identified by steps 201–205 of FIG. 3A, the text blocks may then be analyzed to determine the document orientation by steps 212–220 of FIG. 3B. Optionally, the process of the present invention may include the additional steps of skew detection and correction, rectangle merger and/or block ordering as described in U.S. patent application Ser. No. 07/864,423, titled: "Segmentation of Text Picture and Lines of a Document Image" filed Apr. 6, 1992 now U.S. Pat. No. 5,335,290. Steps 212–220 of FIG. 3B focus on the individual bitmaps from a sample set of the text blocks.

Step 212 selects a subset of the previously identified text blocks for further processing. In one embodiment of the present invention a subset of forty text blocks is used. Step 214 then sums the number of black pixels on each line of the selected text blocks.

Figure 7A:
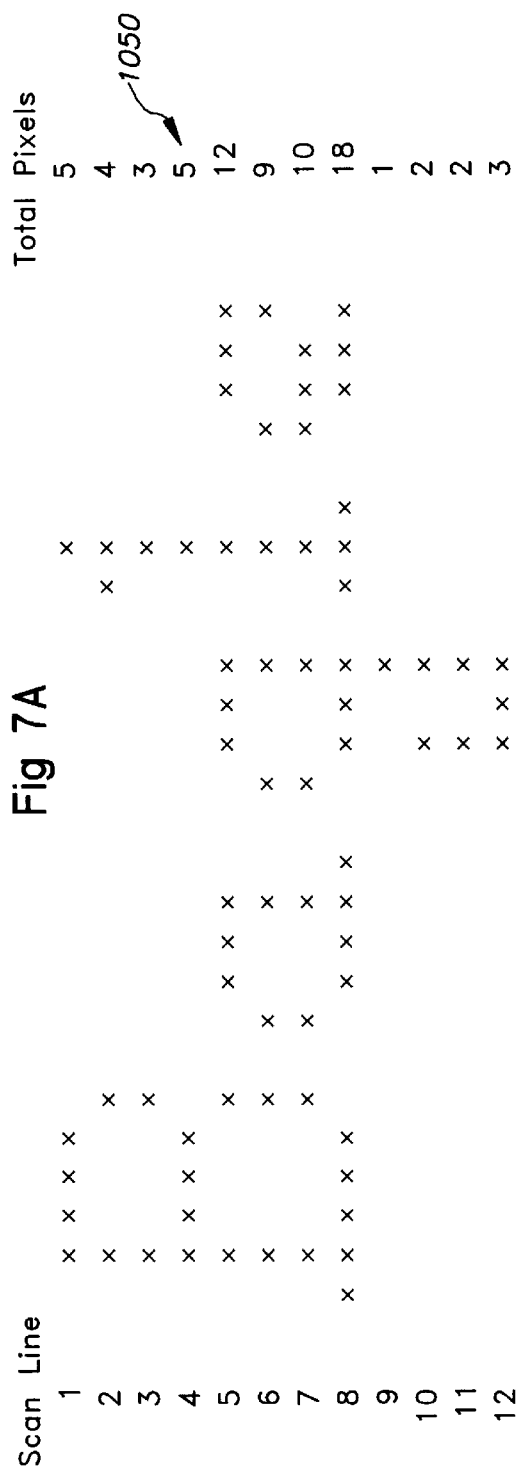
FIG. 7A is an uncompressed text block according to an embodiment of the present invention.
Figure 7C:
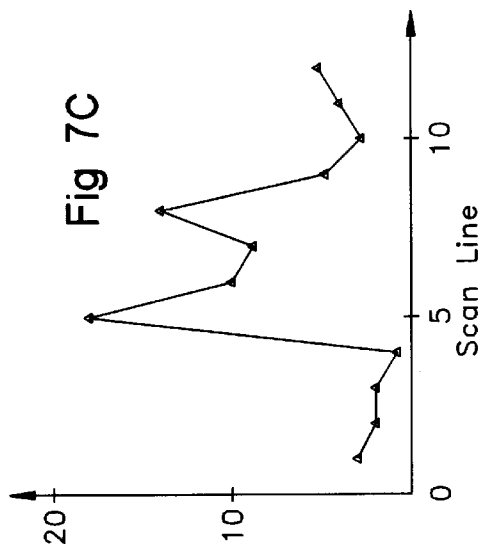
FIG. 7C is a histogram for the text block of FIG. 13A in inverted orientation.

FIG. 7A shows an uncompressed bitmap for a word text block. Each line of the bitmap contains a number of pixels. The pixel totals for each line are summed in the column 1050 located on the right of the figure. The pixel totals from column 1050 may be used to form histogram 1052 of FIG. 7A. Histogram 1052 forms a graphical representation of the number of pixels per scan line. If the text block were inverted, scan line 12 becomes the first scan line. Column 1050 then may be read from bottom to top to obtain the pixel totals for the block when inverted. FIG. 7C contains the histogram for the inverted block.

Figure 7B:
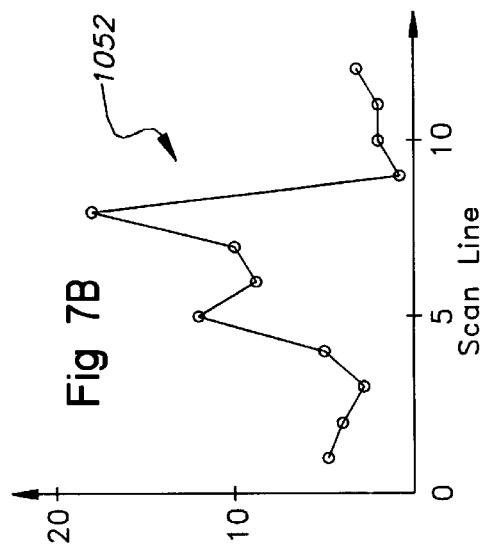
FIG. 7B is a histogram for the text block of FIG. 13A in normal orientation.

Because English language text contains more ascenders than descenders, the histograms in FIGS. 7B and 7C show that inverted images have more pixels at lower line numbers than do normally oriented words. Thus, the histogram data obtained from a subset of document text blocks may be exploited to ascertain the document orientation.

In step 216 of FIG. 3B, the first, second, and third moments of histogram data for a sample set of text blocks is computed. The first, second and third moments correspond to the mean, variance and skew of the data respectively. These parameters for the sample data set are then compared in step 218 to parameters for a normalized set of data to determine document orientation.

Figure 8:
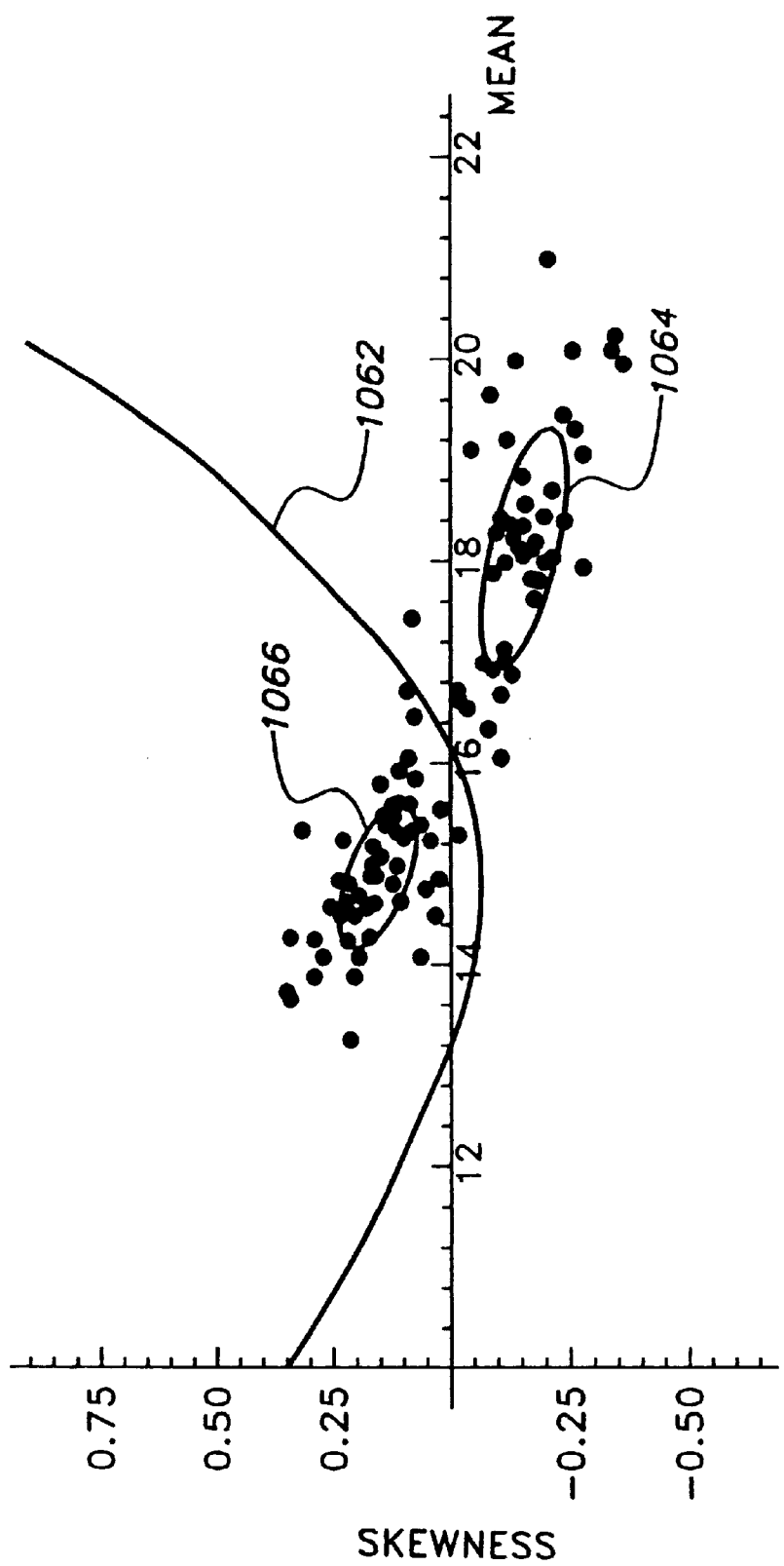
FIG. 8 is a scatter plot of training data.

To obtain the normalized data, a series of images in a known orientation are processed according to the techniques described above. The mean, skew and variance data is determined for the document histograms in the known proper orientation and then again for the known inverted orientation. FIG. 8 contains a graph showing the mean and skewness data. points for each of the several inverted and non inverted samples of English language documents. Data from these two sample parameters produce separable clusters of data through which a Bayesian optimal decision surface 1062 may be drawn by assuming the Gaussian normalized distributions 1064 and 1066 of the training data of the different orientated documents. Distribution 1066 corresponds to inverted images and distribution 1064 corresponds to non-inverted images. The relationship of the image data to decision surface 1062 predicts whether the document image is inverted or not.

In the example of FIG. 8, the decision surface is a parabola. Other functions, including three dimensional functions, are possible. The unique characteristics of the document language and/or typeface will determine the shape of the decision surface. Documents in various languages can therefore be checked for inversion by comparing the histogram data to the decision surface for the appropriate language and/or typeface.

Likewise, the mean, variance and skew data each may be used individually and/or in combination to define a decision surface. For example, the mean of the data may be sufficient to characterize a document as inverted or non-inverted with a high degree of confidence. Therefore, computation and comparison of skew and/or variance data might be omitted to save processing time and memory resources.

In step 220 of FIG. 3B, a signal is output to define the document orientation. If the sample data falls to one side of the decision surface, the document probably is inverted. If the document image sample data falls to the other side of the decision surface, then the document is probably of proper orientation. The signal output to indicate orientation may be, for example, a TRUE or FALSE flag, binary word or a single binary bit.

The signal value may then be optionally used in step 222 of FIG. 3B to instruct CPU 22 to electronically reorient the image. Reorientation of the image may proceed according to techniques well known to those of skill in the art. For example, CPU 22 may execute commands to simply rename the scan line numbers in reverse order. When CPU 22 executes instructions to reproduce the document image onto a display device or physical medium, the document image will then be reproduced in the proper orientation relative to the remaining document images.

ILLUSTRATIVE EXAMPLE

The present example illustrates use of the invention on a photocopier device useful for copying document pages. The example is offered as an illustration of the invention. The invention may be used in other devices and applications and is not limited to the example described below.

Figure 9:
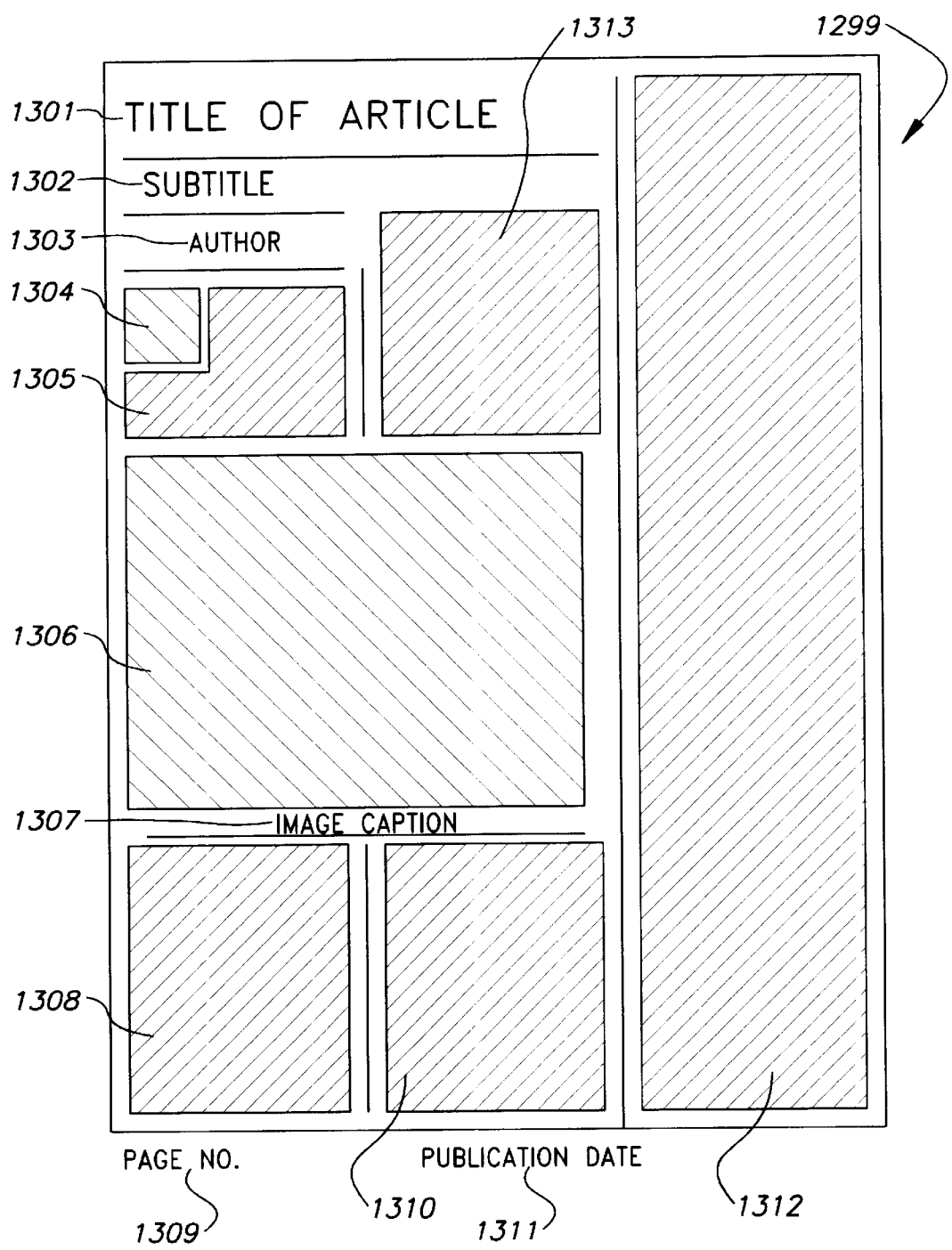
FIG. 9 is an example of a printed page.

FIG. 9 is the first page 1299 of a multipage document that is to be photocopied on a device incorporating the present invention. The document image of FIG. 15 contains text in the title area 1301, subtitle area 1302, author area,image caption area 1307, page number area 1309, publication/date area 1311 and column text areas 1305, 1308, 1310, 1312, and 1313. Image areas 1304 and 1306 are also on the document page.

At the photocopier the operator selects the desired document features using the user input device. These features may include the number of copies to be made, document reduction, and collating features. The operator may also input the language of the document being copied at this time if more than one language is supported by the version the present invention installed on the photocopier. Selection of the appropriate language permits the CPU to compare the document histogram data to the appropriate set of normalized data.

Figure 10:
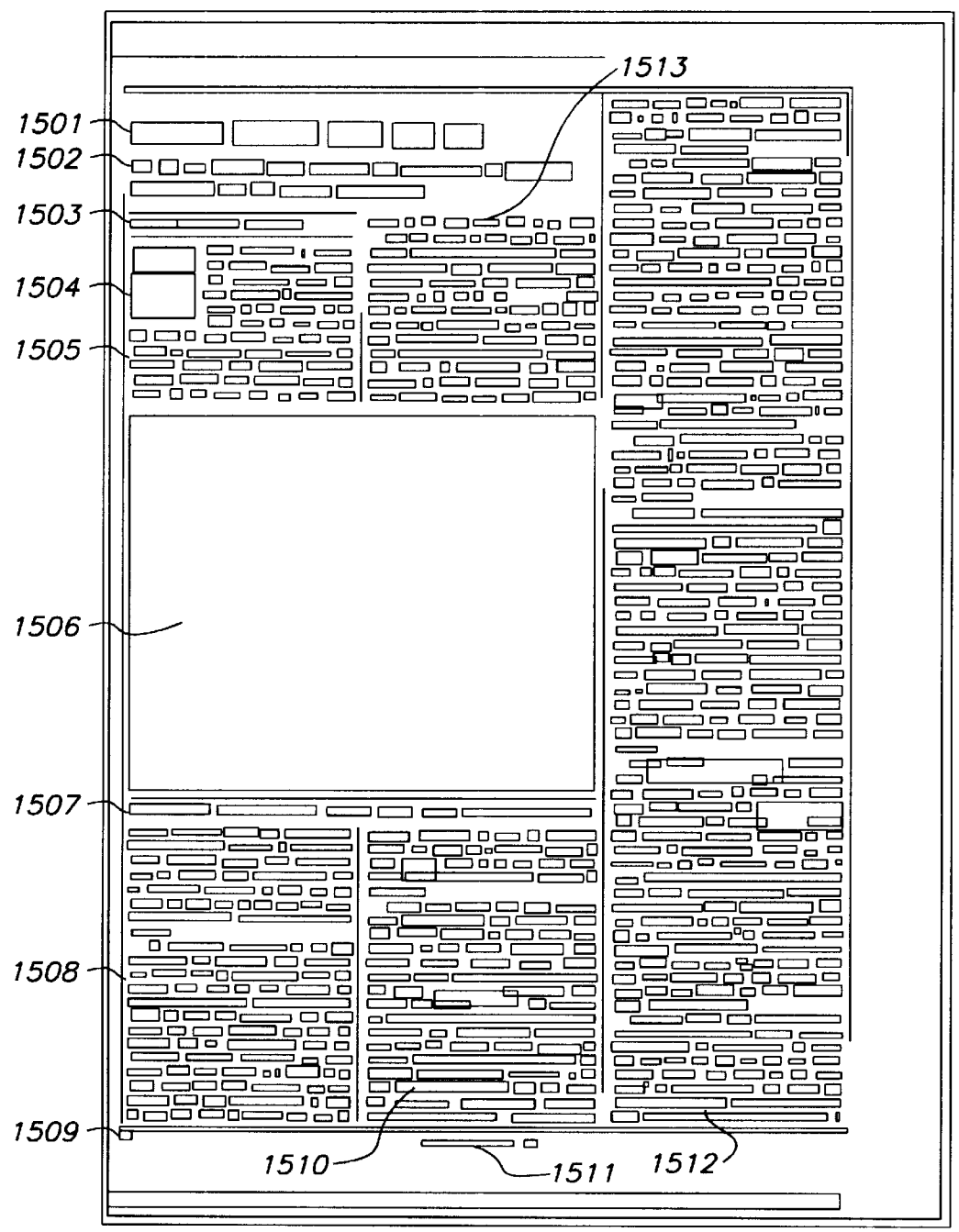
FIG. 10 is a diagram of the example page of FIG. 9 showing the extraction of rectangles according to an embodiment of the present invention.

After selection of the desired reproduction features, a CCD scanner scans page 1299 to obtain a characterization of page 1299 as a pixel image. In FIG. 10, a representation of the image as a set of extracted rectangles is illustrated. FIG. 10 et seq. merely provide a pictorial illustration of the processes of the present invention, and need not ever be a physical manifestation of these processes. Each rectangle of FIG. 10 corresponds to a word, string of words or an image. The major features of the document layout are identifiable. Each of the areas 1501–1519 has a direct relationship with an area 1301–1313 of FIG. 15. For example, title area 1301 corresponds to area 1501, subtitle area 1302 corresponds to area 1502.

Figure 11:
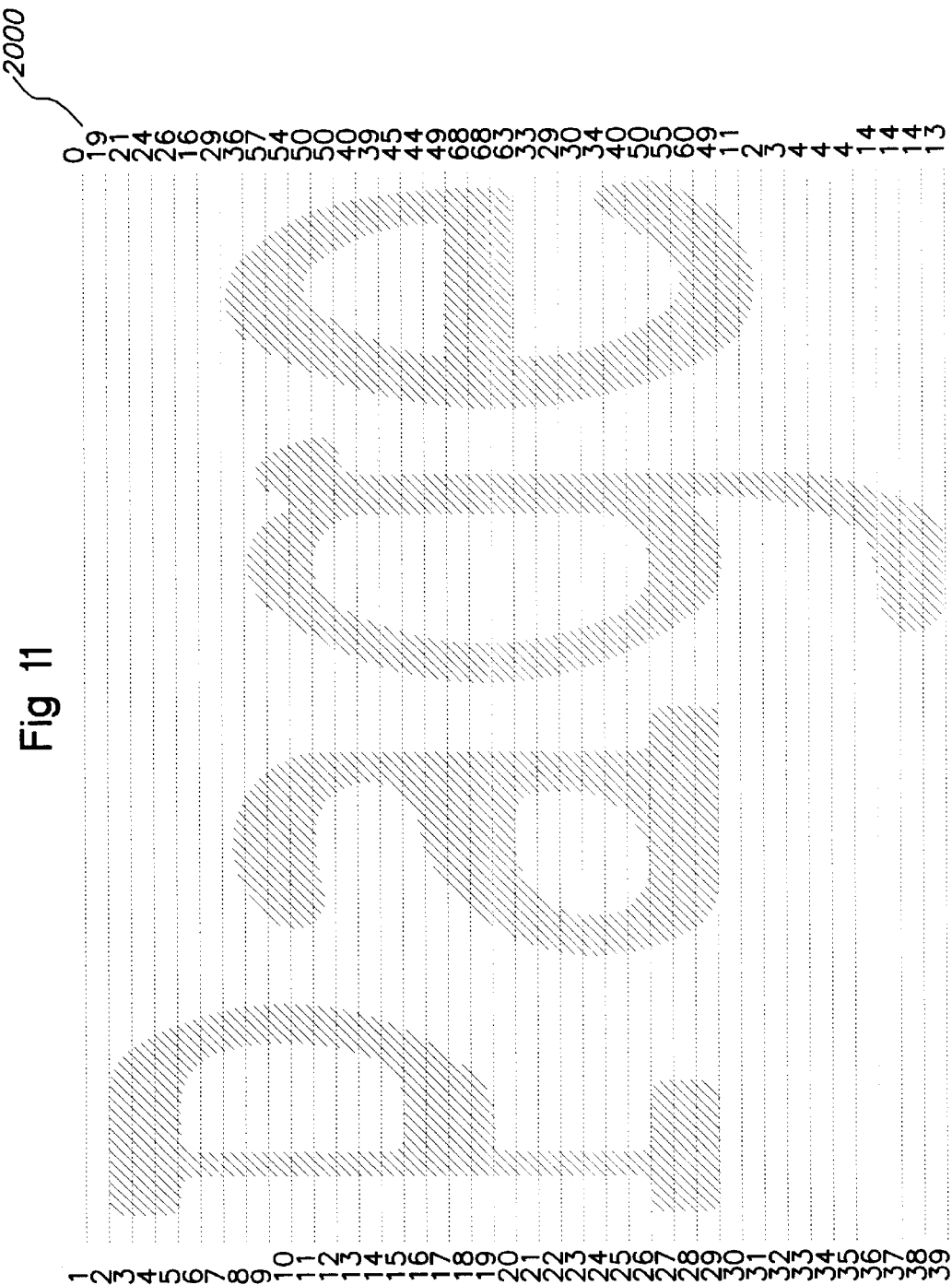
FIG. 11 is a word bitmap for a word contained on the example printed page of FIG. 9.

FIG. 11 shows one example text block taken from one of the text block rectangles identified in FIG. 10. The number of black pixels for each scan line is shown in column 2000. Data of the type shown in column 2000 may be summed for each text block rectangle contained in a sample set of text blocks to obtain a sample set of data for the entire document image.

This sample set of data is then further processed to obtain the mean, variance and skew of the data. Suppose, that for the example given, the moment data is as follows:

mean=18.13 skew=−0.8.

From the user directed inputs, the proper decision surface for a document image of the example language and typeface is shown in FIG. 8. Plotting the mean and skew values for the current example onto the graph of FIG. 8 shows that the sample data lies below the decision surface and the document is not inverted.

Conversely, if the mean and skew values for the example document had been found to be 16.37 and 0.10 respectively, the data point would lie above the decision surface of FIG. 8. The document image therefore would be inverted. CPU 22 may then execute instructions to electronically reorient the image data such that any display or physical reproduction of the document has the proper orientation.

A preferred embodiment of the invention has now been described. Variations and modifications will be apparent to those of skill in the art. For example, processes described herein operate on the image black pixels. Processes may be carried out on the white pixels to derive the relationships described herein by negative implication. For this reason, the invention should be defined in light of the appended claims.

What is claimed is:

1. A method for determining whether a document image is inverted, the method comprising the steps of:
   identifying individual blocks of text, each block including at least one line of text within the document image, each of the individual blocks of text including a plurality of scan lines of pixel data;
   within at least one of the individual blocks of text, summing pixel data indicative of at least one feature in the text having a first of two possible logical values for each one of the plurality of scan lines to thereby obtain a sample data set including pixel distribution information for the at least one of the individual blocks of text;
   calculating a moment of the sample data set;
   determining if the document image is inverted by comparing the moment of the sample data set to at least a first stored normalized moment data set representing an image having a known upright orientation; and
   asserting an inversion signal if the step of comparing indicates the document image is inverted.

2. The method as in claim 1 wherein the step of identifying individual blocks of text comprises identifying individual lines of text within the document image.

3. The method as in claim 2 wherein the at least one feature in the text represents a relative number of ascending and descending features within an individual line of text.

4. The method of claim 2 wherein the blocks of text are not skewed with respect to a horizontal position on the document image.

5. The method of claim 1 wherein the step of determining further comprises the step of:
   defining a decision surface between a normalized set of moment data for documents in a known inverted orientation and a normalized set of moment data for documents in a known upright orientation.

6. The method of claim 5 wherein the step of determining further comprises the step of selecting the normalized set of moment data for documents in a known upright orientation from a plurality of sets of normalized moment data.

7. In a character recognition system, a method for determining inversion of a given image comprising the steps of:
   providing a representation of the image including one or more scan lines to a run length extraction and classification means;
   extracting run lengths from each scan line of the representation of the image;
   classifying each of the run lengths as short, medium or long based on a length of the run length, wherein a plurality of run length records are created;
   constructing rectangles from the run length information, the rectangles representing a portion of the image;
   classifying each of the rectangles as type image, vertical line, horizontal line, or unknown, the unknown rectangles primarily including individual text blocks;
   summing pixel data having a first of two possible logical values for each one of the plurality of scan lines within a given set of the individual text blocks to obtain a sample data set including information regarding pixel distribution within the given set of the individual text blocks;
   calculating a moment of the sample data set;
   comparing the moment of the sample data set to at least a first stored normalized moment data set representing an image having a known orientation to determine if the given image is inverted;
   automatically asserting an inversion signal if the step of comparing indicates the given image is inverted; and
   reorienting the given image in a non-inverted position when the inversion signal is asserted.

8. The method as in claim 7 wherein the step of identifying individual blocks of text comprises identifying individual lines of text within the document image.

9. The method as in claim 8 wherein the moment of the sample data set represents the relative number of ascending and descending features within an individual line of text.

10. The method of claim 9 wherein the unknown rectangles primarily include individual lines of text, and the individual lines of text are not skewed with respect to a horizontal position on the document image.

11. The method of claim 10 wherein the step of comparing further comprises the step of defining a decision surface between a normalized set of moment data for images in a known inverted orientation and a normalized set of moment data for images in a known upright orientation.

12. An apparatus for determining the orientation of a document image being processed, the apparatus comprising:

means for identifying individual blocks of text within the document image, each of the individual blocks of text including a plurality of scan lines of pixel data;

means for summing pixel data having a first of two possible logical values for each one of the plurality of scan lines within a given set of the individual blocks of text to obtain a sample data set including information regarding pixel distribution;

means for calculating a moment of the sample data set;

means for determining if the given document image is inverted by comparing the moment of the sample data set to at least a first stored normalized moment data set representing an image having a known orientation; and means for electronically reorienting the document image to an upright orientation when the means for comparing. determines the document image is inverted.

13. The apparatus of claim 12 the individual blocks of text each include only a single line of text, and further comprising means for selecting the normalized moment data from among a plurality of normalized moment data.

14. A photocopier comprising:

means for automatically scanning a hard copy document to obtain a digital document image;

a memory for storing at least a first set of normalized data for documents in a known orientation; and a processor, coupled to the means for scanning and to the memory, for:

identifying individual blocks of text each including at least one line of text within the document image, each of the individual blocks of text including a plurality of scan lines;

summing pixel data having a first of two possible logical values along the plurality of scan lines for at least one of the lines of text with the set of the individual blocks of text to obtain a sample data set, the data set including information regarding pixel distribution in the set of the individual blocks of text;

calculating a moment of the sample data set;

comparing the moment of the sample data set to the at least first set of normalized data retrieved from the memory to determine when the hard copy document is inverted; and automatically reorienting the document image to form a document image of upright orientation if the comparing function determines the hard copy document is inverted; and means for reorienting the digital document image to producing a hard copy representation of the hard copy document in its upright orientation.

15. An apparatus for automatically processing documents comprising:

means for obtaining a digital document image;

a memory for storing at least a first set of normalized data for documents in a known orientation; and a processor, coupled to the means for obtaining and to the memory, for:

identifying individual blocks of text within the document image, each of the individual blocks of text including at least one line of text having a plurality of scan lines;

summing pixel data having a first of two possible logical values for each one of the plurality of scan lines within at least one of the individual blocks of text to obtain a sample data set, the sample data set including pixel distribution information;

calculating a moment of the sample data set;

determining if the hard copy document is inverted by comparing the moment of the sample data set to the at least first set of normalized data retrieved from the memory; and electronically reorienting the document image to form an upright orientation document image when the hard copy document is determined to be inverted; and means for producing the upright orientation document image.

16. The apparatus of claim 15 wherein the apparatus comprises an area network.

17. The apparatus of claim 15 wherein the apparatus comprises a personal computer.

18. The apparatus of claim 15 wherein the apparatus comprises a facsimile machine.

* * * * *